United States Patent
Kokal et al.

(10) Patent No.: US 9,453,781 B2
(45) Date of Patent: Sep. 27, 2016

(54) METHOD AND TEST BENCH FOR TESTING A STARTER MOTOR

(71) Applicant: AVL LIST GMBH, Graz (AT)

(72) Inventors: Helmut Kokal, Graz (AT); Matthias Dank, Graz (AT); Peter Holzhammer, Thondorf (AT); Ronald Prettenthaler, Semriach (AT); Martin Stockreiter, Allerheiligen (AT)

(73) Assignee: AVL LIST GMBH, Graz (AT)

( * ) Notice: Subject to any disclaimer, the term of this patent is extended or adjusted under 35 U.S.C. 154(b) by 213 days.

(21) Appl. No.: 14/362,505

(22) PCT Filed: Oct. 2, 2012

(86) PCT No.: PCT/EP2012/069451
§ 371 (c)(1),
(2) Date: Jun. 3, 2014

(87) PCT Pub. No.: WO2013/087244
PCT Pub. Date: Jun. 20, 2013

(65) Prior Publication Data
US 2014/0366616 A1    Dec. 18, 2014

(30) Foreign Application Priority Data
Dec. 15, 2011 (AT) .................. A 1836/2011

(51) Int. Cl.
*G01M 15/02* (2006.01)
*G01M 15/04* (2006.01)

(52) U.S. Cl.
CPC ........... *G01M 15/044* (2013.01); *G01M 15/02* (2013.01)

(58) Field of Classification Search
USPC .......................... 73/114.25, 114.59, 114.77
See application file for complete search history.

(56) References Cited

U.S. PATENT DOCUMENTS

| | | | | |
|---|---|---|---|---|
| 3,789,659 A | * | 2/1974 | Haldeman | G01L 3/22 73/114.13 |
| 5,195,366 A | * | 3/1993 | Duncan | G01R 31/005 73/114.59 |

(Continued)

FOREIGN PATENT DOCUMENTS

| | | |
|---|---|---|
| CN | 101320254 | 12/2008 |
| DE | 102006045973 | 4/2008 |

OTHER PUBLICATIONS

English Translation of CN 101320254A.
(Continued)

*Primary Examiner* — Eric S McCall
(74) *Attorney, Agent, or Firm* — Dykema Gossett PLLC

(57) ABSTRACT

To enable testing of a starter motor on a test bench with an electrical dynamometer as a replacement for a real combustion engine, a simulation unit (20) is used in which a mathematical model of the combustion engine is implemented, and the simulation unit (20) determines a new load setpoint ($n_s$, $T_s$) using the mathematical model from measured actual values ($\phi_i$, $n_i$, $T_i$) of the operation of the electrical dynamometer (3) at every scanning time point of a regulation, which new load setpoint ($n_s$, $T_s$) is fed to the regulator (21) of the electrical dynamometer.

3 Claims, 2 Drawing Sheets

(56) References Cited

U.S. PATENT DOCUMENTS

| | | | |
|---|---|---|---|
| 6,360,591 B1 | 3/2002 | Carley | |
| 6,405,585 B1 * | 6/2002 | Hewitt | G01M 15/044 73/114.77 |
| 8,825,272 B1 * | 9/2014 | Chinnadurai | G01R 31/34 180/65.285 |
| 9,206,782 B2 * | 12/2015 | Chinnadurai | G01R 31/34 |
| 2004/0118194 A1 * | 6/2004 | Raichle | F02N 11/10 73/114.62 |
| 2005/0016295 A1 * | 1/2005 | Kemnade | G01M 15/046 73/862.28 |
| 2006/0090551 A1 * | 5/2006 | Murphy | G01M 15/00 73/116.04 |
| 2006/0090554 A1 * | 5/2006 | Krampitz | H02K 15/00 73/116.04 |
| 2006/0090555 A1 * | 5/2006 | Krampitz | H02K 15/00 73/116.04 |
| 2006/0090571 A1 * | 5/2006 | Krampitz | G01M 15/02 73/856 |
| 2006/0091597 A1 * | 5/2006 | Opsahl | B25B 11/02 269/45 |
| 2006/0092584 A1 * | 5/2006 | Raichle | H02H 3/023 361/20 |
| 2006/0136119 A1 * | 6/2006 | Raichle | F02N 11/10 701/114 |
| 2006/0288764 A1 * | 12/2006 | Langthaler | G01M 13/025 73/114.15 |
| 2010/0050759 A1 * | 3/2010 | Vickio, Jr. | G01M 15/02 73/116.06 |
| 2011/0000291 A1 * | 1/2011 | Mayrhofer | G01M 15/02 73/116.05 |
| 2011/0041595 A1 * | 2/2011 | Dank | G01M 15/02 73/116.06 |
| 2013/0297247 A1 * | 11/2013 | Jardine | G01R 31/34 702/113 |
| 2013/0325405 A1 * | 12/2013 | Miller | G06F 15/00 702/183 |
| 2014/0081527 A1 * | 3/2014 | Miller | G01M 17/00 701/48 |
| 2014/0260577 A1 * | 9/2014 | Chinnadurai | G01R 31/34 73/114.59 |
| 2014/0278020 A1 * | 9/2014 | Neet | F02N 11/087 701/112 |

OTHER PUBLICATIONS

English Abstract of DE 2006045973.

* cited by examiner

METHOD AND TEST BENCH FOR TESTING A STARTER MOTOR

BACKGROUND OF THE INVENTION

1. Field of the Invention

The invention relates to a method and to a test bench for testing a starter motor with an electrical dynamometer that is connected to the starter motor and simulates a combustion engine, and a regulator for regulating the electrical dynamometer.

2. The Prior Art

Due to new technologies such as start-stop technology, for example, starter motors for combustion automobiles are subjected to ever-increasing demands, particularly as regards the required number of starting sequences. While 30,000 starting sequences were required 5 years ago, 300,000 starting sequences are already demanded today of starter motors. This necessarily also increases the requirements for the testing of starter motors. Tests on real combustion engines that were previously commonplace can hardly be carried out any more. This is because, on the one hand, at the time of the testing of a starter motor for a new combustion engine or for a new drive train, the latter is oftentimes not even available yet and, on the other hand, the expense of such a test bench is too high, both in terms of costs and time involved, as a result of the necessary media connections and supply lines, e.g., for cooling water, fuel, exhaust, oil, etc., of the combustion engine.

For this reason, test benches for starter motors of combustion engines have already been conceived in which the combustion engine is replaced and simulated by an electrical machine. DE 10 2006 045 973 A1 describes one such test bench. There, the electrical machine is regulated according to a predefinable test characteristic. The test characteristic can be created from measurements on the real combustion engine or from a virtual engine model. However, the test characteristic is then only preset for the respective test run and is removed for every test run, which is repeated 50,000 times, for example.

The problem here is that a system consisting of starter motor and combustion engine does not have an exact deterministic temporal profile. Rather, such an electromechanical system exhibits, within certain limits, a temporally random behavior that can change on the order of magnitude of milliseconds. For example, the timing sequence varies from the point in time of the start signal to the introduction of the starter pinion and until the starter motor builds up the required torque due to the mechanics and electromechanical parts (e.g., relay). Likewise, there can be variations in the timing in the torque generation. As a result, the theoretical characteristic and actual operation are not completely congruent, but rather there can be some time-shifting. For example, if the starter motor is supposed to have already started up according to the test characteristic, i.e., already have a speed of ng, a speed n=0 may still be specified for the dynamometer, which has the effect of a blocking motor. As a result, the starter current would increase greatly, which can lead to unrealistic loads on the starter motor and on the starter pinion and starter ring. Such a test run would not be representative, nor could it be taken into account in testing. What is more, practical experiments have also shown that, as a result of this, damage profiles occur on the starter motor when operating on such a test bench that do not occur in practice. This of course renders such a test bench unusable for real testing of starter motors.

It is therefore the object of the present invention to remedy the above-mentioned problems during the testing of starter motors on test benches using an electrical dynamometer.

SUMMARY OF THE INVENTION

This object is achieved according to the invention as follows: In a simulation unit in which a mathematical model of the combustion engine is implemented, actual values of the operation of the electrical dynamometer at each scanning time point of the regulation measured using the mathematical model, a new load nominal value is determined that is fed to the regulator. Since no time-based test characteristic is prescribed, but rather the expected current state of the combustion engine is calculated for every scanning time point of the regulation, it is ensured at every point in time that the regulation of the current state is used as the basis, thus avoiding time-shifting of the actual state and nominal specifications. Consequently, such regulation is insensitive to unavoidable, random temporal variations in the electromechanical system consisting of combustion engine and starter motor.

The precision of the test bench and of the testing method can be increased if the moment of inertia of the electrical dynamometer corresponds substantially to the moment of inertia of the real combustion engine.

The present invention is explained in further detail below with reference to the exemplary, schematic and non-limiting FIGS. 1 and 2.

DETAILED DESCRIPTION OF THE DRAWINGS

Figure 1:
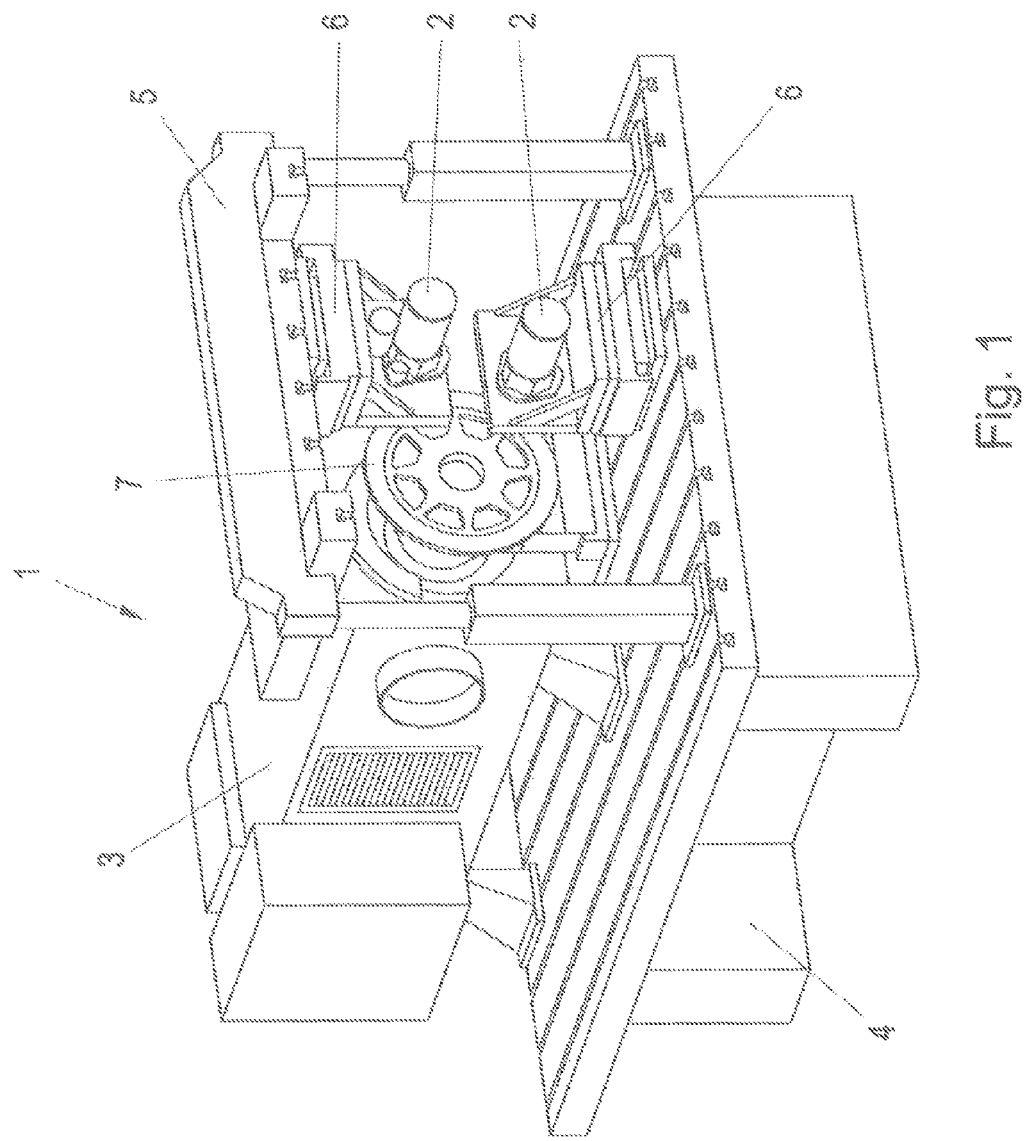
FIG. 1 shows a test bench according to the invention.

A test bench 1 according to the invention for testing starter motors 2, as shown in FIG. 1, comprises an electrical dynamometer 3, e.g., a permanently magnetic excited synchronous motor, a retaining means 5 for the positionally correct attachment of a starter motor 2, and a base support 4 on which the individual parts of the test bench 1 are arranged. Furthermore, an electrical power unit 11, for example a 12 V automobile battery or a battery simulator, is provided (see FIG. 2). If a battery simulator is used, then test runs can also be conducted with different battery charging states.

The retaining means 5 can provide a support device 6 on which the starter motor 2 is attached. The support device 6 can be moved relative to the retaining means 5, and/or the retaining means 5 can be moved relative to the base support 4, in order to easily align the starter motor 2 in the correct position with respect to the electrical dynamometer 3 and fix it in the proper position. It is also possible to arrange a second starter motor 2 on the test bench, as shown in FIG. 1, in order to test several starter motors 2 at the same time using one test bench. For this purpose, a provision can be made that another starter motor 2 is also arranged on the retaining means 5. Alternatively, it can also be arranged with a support device 6 directly on the base support 4.

On the output side, a starter ring 7 is provided on the electrical dynamometer 3. The starter ring 7 is preferably commensurate with the real starter ring that would also be installed in an automobile. A known starter pinion 8 (see FIG. 2, not shown here) is arranged on the starter motor 2 that engages in the starter ring 7 for the starting process. The engagement and starting process has long since been inherently known, for which reason it will not be discussed further here. The electrical dynamometer 3 simulates a combustion engine here that is to be started by the starter motor 2. A provision can also be made to bring the starter ring 7 into a parameterizable position before starting.

Figure 2:
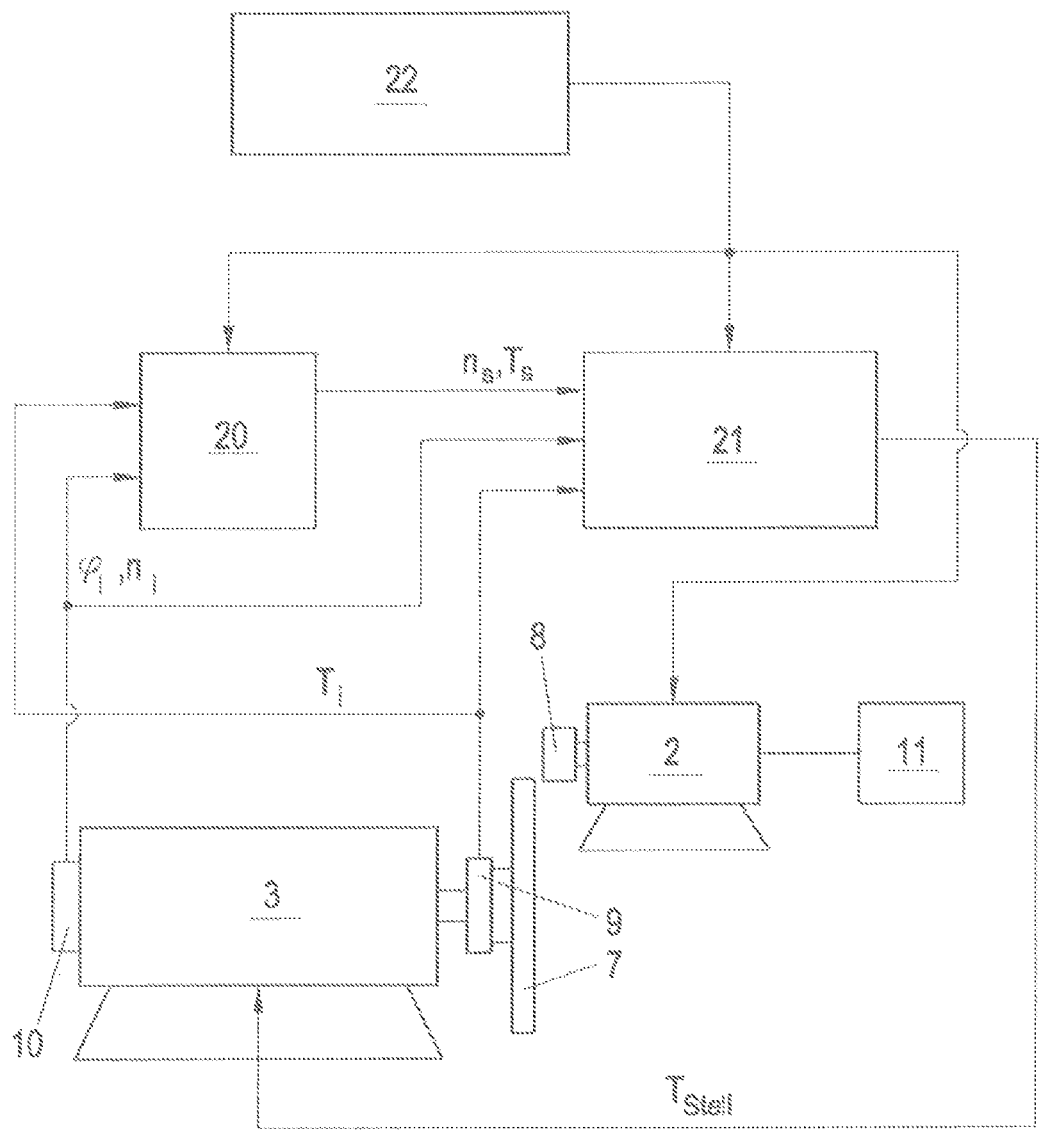
FIG. 2 shows a block diagram of the regulating concept according to the invention.

Measuring devices, such as an angle transmitter 10 for detecting the angle of rotation $\phi_i$ and/or engine speed $n_i$, and/or a measuring flange 9 for detecting the torque of the electrical dynamometer 3, are mounted on the electrical dynamometer 3, as shown in FIG. 2. The engine speed $n_i$ can of course also be derived from the angle of rotation $\phi_i$.

In a simulation unit 20, a mathematical model of the combustion engine is implemented which simulates the combustion engine. The model is preferably embodied such that it can simulate the combustion engine from startup forward, which is to say, beginning at engine speed n=0. In this context, "simulate" means that the model can calculate a current operational state of the engine speed based on the current actual angle of rotation $\phi_i$ or equivalent elapsed time, from startup and based on a current operational state of the electrical dynamometer 3, for example in the form of an actual engine speed $n_i$ and/or of an actual torque $T_i$, and output it in the form of a load setpoint, for example a nominal engine speed $n_s$ in the case of speed regulation or a nominal torque $T_s$ in the case of torque regulation. The load setpoint calculated in this way is fed to a regulator 21 that regulates a torque setpoint $T_{stell}$ or engine speed setpoint $n_{stell}$ and thus regulates the electrical dynamometer 3. For this purpose, the regulator 21 can also be given the current actual values, e.g., actual angle of rotation $\phi_i$, actual engine speed $n_i$ and/or actual torque $T_i$.

The test run is controlled, monitored and evaluated by a test bench control unit 22. The test bench control unit 22 can be connected to the simulation unit 20, to the regulator 21, to the starter motor 2 and/or to the electrical dynamometer 3 and exchange data. Particularly, a test run is started by the test bench control unit 22 by means of a start signal.

Upon commencement of the test run, the simulation unit 20 calculates the correct current operational state of the combustion engine from the mathematical model at each scanning time point of the control, e.g., every 100 μs, for the current angle of rotation ϕ from startup or for the current time from startup and transfers a load setpoint, e.g., in the form of a nominal engine speed $n_s$ and/or a nominal torque $T_s$, to the regulator 21, which converts this reference setting, for example, into a real torque (torque setpoint $T_{stell}$) of the electrical dynamometer 3, which is to say it regulates the electrical dynamometer 3 such that the calculated load state for the starter motor 2 is set on the electrical dynamometer 3.

Due to the highly dynamic behavior of combustion engines and of the electrical dynamometer 3 as a simulation of the combustion engine, it is advantageous if the regulation used as the basis in the regulator 21 has a short reaction time, preferably <1 msec, which enables quick response to changes in the actual values and a high scanning frequency of the regulation, for instance 10 kHz, as is the case here. Inherently known regulation algorithms can also be used with which the reaction time in the control loop is compensated for at least in part.

It is also advantageous if the moment of inertia of the electrical dynamometer 3 corresponds substantially to that of the real combustion engine. The moments of inertia differ here preferably by no more than 20%, especially advantageously by no more than 10%, and very especially preferably by no more than 5%. The moment of inertia of the combustion engine is simulated by the electrical dynamometer 3. For reasons relating to system response times and system nonlinearities, this inertia simulation is not ideal. However, the closer the inertia to be simulated is to the real inertia of the electrical machine, the more precisely the simulation of the combustion engine and the test bench 1 functions for testing the starter motor 2.

The invention claimed is:

1. A test bench for testing a starter motor, said test bench comprising:
    an electrical dynamometer which can be rotated by the starter motor to simulate starting of a combustion engine, said electrical dynamometer including sensors for providing measurements of actual values of an operational state of the electrical dynamometer at scanning time points,
    a regulator for regulating the electrical dynamometer, said regulator operating based on load setpoint values, and
    a simulation unit which determines new setpoint values of a load of the electrical dynamometer from the actual values of the operational state of the electrical dynamometer at every scanning time point using a mathematical model of the combustion engine that simulates the combustion engine and transmitting said new setpoint values of the load to the regulator.

2. A test bench according to claim 1, wherein the sensors include at least one of a rotational angle sensor, a speed sensor and a torque sensor for providing measurements of actual values of at least one of rotational angle, speed and torque of the electrical dynamometer to the simulation unit.

3. A test bench according to claim 2, wherein the simulation unit determines new speed setpoint or torque setpoint values.

* * * * *